(12) United States Patent
Khurana et al.

(10) Patent No.: US 11,905,429 B2
(45) Date of Patent: Feb. 20, 2024

(54) INK-RECEPTIVE LAYERS FOR DURABLE LABELS

(71) Applicant: 3M INNOVATIVE PROPERTIES COMPANY, St. Paul, MN (US)

(72) Inventors: Rachna Khurana, Inver Grove Heights, MN (US); Maciej P. Pietras, Wroclaw (PL); Benjamin R. Coonce, South St. Paul, MN (US); Naiyong Jing, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/733,091

(22) PCT Filed: Nov. 16, 2018

(86) PCT No.: PCT/IB2018/059042
§ 371 (c)(1),
(2) Date: May 14, 2020

(87) PCT Pub. No.: WO2019/097469
PCT Pub. Date: May 23, 2019

(65) Prior Publication Data
US 2020/0283638 A1 Sep. 10, 2020

Related U.S. Application Data

(60) Provisional application No. 62/587,792, filed on Nov. 17, 2017.

(51) Int. Cl.
| | | |
|---|---|---|
| *C09D 5/00* | (2006.01) | |
| *C09D 167/00* | (2006.01) | |
| *C09D 7/61* | (2018.01) | |
| *C09D 7/40* | (2018.01) | |
| *B41M 5/52* | (2006.01) | |
| *C09D 133/10* | (2006.01) | |
| *C09D 167/02* | (2006.01) | |

(52) U.S. Cl.
CPC ............ *C09D 167/00* (2013.01); *B41M 5/52* (2013.01); *C09D 5/002* (2013.01); *C09D 7/61* (2018.01); *C09D 7/67* (2018.01); *C09D 7/68* (2018.01); *C09D 133/10* (2013.01); *C09D 167/02* (2013.01); *B41M 5/5218* (2013.01); *B41M 5/5254* (2013.01); *B41M 5/5272* (2013.01); *B41M 5/5281* (2013.01)

(58) Field of Classification Search
CPC .... B41M 5/52; B41M 5/5254; B41M 5/5218; B41M 5/5272; B41M 5/5281; C09D 7/61; C09D 7/67; C09D 7/68; C09D 5/002; C09D 133/10; C09D 167/00; C09D 167/02; C09D 175/04; C09D 151/003; C08F 265/06

See application file for complete search history.

(56) References Cited

U.S. PATENT DOCUMENTS

| | | | |
|---|---|---|---|
| 5,203,884 A | 4/1993 | Buchanan | |
| 5,461,125 A | 10/1995 | Lu | |
| 5,639,546 A | 6/1997 | Bilkadi | |
| 6,077,656 A * | 6/2000 | Majumdar | G03C 1/85 430/527 |
| 6,150,036 A | 11/2000 | Lubar | |
| 6,866,383 B2 | 3/2005 | Naik | |
| 6,926,957 B2 | 8/2005 | Engel | |
| 7,008,979 B2 | 3/2006 | Schottman | |
| 7,393,571 B2 | 7/2008 | Chapman | |
| 7,432,322 B2 | 10/2008 | Hood | |
| 2003/0143344 A1* | 7/2003 | Yau | B41M 5/52 428/32.1 |
| 2003/0180480 A1 | 9/2003 | Fruge | |
| 2003/0203991 A1* | 10/2003 | Schottman | C09D 7/61 523/334 |
| 2003/0224150 A1 | 12/2003 | Ludwig | |
| 2005/0019508 A1 | 1/2005 | Engel | |
| 2005/0031806 A1* | 2/2005 | Kim | B41M 5/52 428/32.38 |
| 2006/0013971 A1 | 1/2006 | Chen | |
| 2007/0032588 A1* | 2/2007 | Hood | C09D 139/00 524/493 |
| 2008/0033142 A1* | 2/2008 | Ogata | B41M 5/506 528/370 |
| 2008/0081160 A1 | 4/2008 | Anderle | |
| 2009/0123674 A1* | 5/2009 | Shaw-Klein | B41M 5/506 347/100 |

(Continued)

FOREIGN PATENT DOCUMENTS

| | | |
|---|---|---|
| EP | 0250154 | 12/1987 |
| EP | 0801602 | 10/1997 |

(Continued)

OTHER PUBLICATIONS

International Search Report for PCT International Application No. PCT/IB2018/059042, dated May 21, 2019, 7 pages.

*Primary Examiner* — Alexander C Kollias
(74) *Attorney, Agent, or Firm* — Kathleen B. Gross

(57) ABSTRACT

Coatable compositions for formation of ink-receptive layers, which may be aqueous suspensions, comprise a mixture of: a) 8.0-75 wt % (based on the total weight of a), b), c), and d)) of colloidal silica particles having an average particle size of 2.0-150 nm; b) 10-75 wt % of one or more polyester polymers; c) 10-75 wt % of one or more polymers selected from the group consisting of polyurethane polymers and (meth)acrylate polymers; and d) 0-10 wt % of one or more crosslinkers. Ink-receptive layers, which may exhibit high gloss and high ink anchoring are also provided, as are constructions comprising such layers. Porous solids are also provided, comprising: a) 8.0-75 wt % of colloidal silica particles having an average particle size of 2.0-150 nm; and b) one or more water dispersible polymers.

20 Claims, 2 Drawing Sheets

(56) References Cited

U.S. PATENT DOCUMENTS

| | | |
|---|---|---|
| 2009/0324857 A1 | 12/2009 | Okuda |
| 2011/0200803 A1 | 8/2011 | Li |
| 2012/0010327 A1 | 1/2012 | Jing |
| 2014/0292951 A1 | 10/2014 | Ferrar |
| 2015/0166829 A1 | 6/2015 | Koger |
| 2015/0329742 A1 | 11/2015 | Baker |
| 2021/0124575 A1* | 4/2021 | Bell, IV .................... G06F 8/71 |

FOREIGN PATENT DOCUMENTS

| | | |
|---|---|---|
| EP | 0835186 | 4/1998 |
| EP | 0995609 | 4/2000 |
| EP | 1481812 | 12/2004 |
| EP | 1499667 | 1/2005 |
| EP | 2138320 | 12/2009 |
| EP | 2261043 | 12/2010 |
| EP | 2355982 | 8/2011 |
| EP | 2393665 | 12/2011 |
| EP | 3080211 | 10/2016 |
| WO | WO 1997-001448 | 1/1997 |
| WO | WO 1999-039914 | 8/1999 |
| WO | WO 2000-060024 | 10/2000 |
| WO | WO 2000-071360 | 11/2000 |
| WO | WO 2002-043965 | 6/2002 |
| WO | WO 2002-062894 | 8/2002 |
| WO | WO 2003-029015 | 4/2003 |
| WO | WO 2010-114698 | 10/2010 |
| WO | WO 2011-087997 | 7/2011 |
| WO | WO 2016-025319 | 2/2016 |

* cited by examiner

INK-RECEPTIVE LAYERS FOR DURABLE LABELS

CROSS REFERENCE TO RELATED APPLICATIONS

This application is a national stage filing under 35 U.S.C. 371 of PCT/IB2018/059042, filed Nov. 16, 2018, which claims the benefit of U.S. Provisional Patent Application No. 62/587,792, filed Nov. 17, 2017, the disclosure of which is incorporated by reference in its/their entirety herein.

FIELD OF THE DISCLOSURE

This disclosure relates to printable durable labels, ink-receptive layers such as may form a part of such labels, and coatable compositions such as may be used to make such ink-receptive layers.

BACKGROUND OF THE DISCLOSURE

The following references may be relevant to the general field of technology of the present disclosure: WO 03/029015 A2; US 2015/0166829 A1; EP 3,080,211; US2003/0224150 A1; U.S. Pat. No. 5,461,125; WO 1999/039914 A1; US 2012/0010327 A1; US 2015/0329742; WO 2002/62894; US 2009/324857; US 2014/292951; EP 2,261,043; U.S. Pat. No. 6,150,036; WO 2016/025319 A; EP 0,801,602 B1; EP 1,419,048; EP 2,393,665; WO 0060024 A; US 2008/0081160; EP 0995609 B; WO 0243965; EP 0,835,186 B1; EP 0837778 A; US 2011/200803 A; EP 2,355,982 B1; and U.S. Pat. No. 7,432,322 B.

SUMMARY OF THE DISCLOSURE

Briefly, the present disclosure provides coatable compositions for formation of an ink-receptive layer comprising a mixture of: a) 8.0-75 wt %, based on the total weight of a), b), c), and d), of colloidal silica particles having an average particle size of 2.0-150 nm; b) 10-75 wt %, based on the total weight of a), b), c), and d), of one or more polyester polymers; c) 10-75 wt %, based on the total weight of a), b), c), and d), of one or more polymers selected from the group consisting of polyurethane polymers and (meth)acrylate polymers; and d) 0-10 wt %, based on the total weight of a), b), c), and d), of one or more crosslinkers. In some embodiments, the coatable composition is an aqueous suspension. In some embodiments, the one or more crosslinkers are present in an amount of at least 0.5 wt %, based on the total weight of a), b), c), and d). In some embodiments, the one or more polyester polymers include sulfonated polyester polymers. Additional embodiments of the coatable compositions of the present disclosure are described below under "Selected Embodiments."

In another aspect, the present disclosure provides ink-receptive layers comprising a mixture of: a) 8.0-75 wt %, based on the total weight of a), b), and c), of colloidal silica particles having an average particle size of 2.0-150 nm; b) 10-75 wt %, based on the total weight of a), b), and c), of one or more polyester polymers; and c) 10-75 wt %, based on the total weight of a), b), and c), of one or more polymers selected from the group consisting of polyurethane polymers and (meth)acrylate polymers. In another aspect, the present disclosure provides ink-receptive layers comprising a mixture of: I) 8.0-75 wt %, based on the total weight of I) and II), of colloidal silica particles having an average particle size of 2.0-150 nm; and II) crosslinked polymer obtained by reacting to form crosslinks a mixture of: b) 20-80 wt %, based on the total weight of b), c), and d), of one or more polyester polymers; c) 20-80 wt %, based on the total weight of b), c), and d), of one or more polymers selected from the group consisting of polyurethane polymers and (meth)acrylate polymers; and d) 0.1-12 wt %, based on the total weight of b), c), and d), of one or more crosslinkers. In some embodiments, the one or more polyester polymers in the ink-receptive layers include sulfonated polyester polymers. In some embodiments, the ink-receptive layers have a 60 degree gloss of at least 50, at least 60, at least 70, or in some embodiments at least 80. In some embodiments, the ink-receptive layers include pores having a diameter of 0.05 micrometers or greater. In some embodiments, such pores are present in a density such that a cross-section of the ink-receptive layer intersects 1 or more of such pores per 4.0 square micrometers. Additional embodiments of the ink-receptive layers of the present disclosure are described below under "Selected Embodiments."

In another aspect, the present disclosure provides constructions comprising the ink-receptive layer according to the present disclosure bound to a substrate layer. In some embodiments, the substrate layer comprises a material selected from the group consisting of polyester, polyethylene terephthalate (PET), polypropylene (PP), vinyl and polyvinyl chloride (PVC). Additional embodiments of the constructions of the present disclosure are described below under "Selected Embodiments."

In another aspect, the present disclosure provides porous solids, comprising: a) 8.0-75 wt % of colloidal silica particles having an average particle size of 2.0-150 nm; and b) one or more water dispersible polymers. In some embodiments, the porous solids includes pores having a diameter of 0.05 micrometers or greater. In some embodiments, the pores are present in a density such that a cross-section of the porous solid intersects 1 or more of such pores per 4.0 square micrometers. In some embodiments, the one or more water dispersible polymers include one or more polyester polymers and one or more polymers selected from polyurethane polymers and (meth)acrylate polymers. Additional embodiments of the porous solids of the present disclosure are described below under "Selected Embodiments."

The preceding summary of the present disclosure is not intended to describe each embodiment of the present invention. The details of one or more embodiments of the invention are also set forth in the description below. Other features, objects, and advantages of the invention will be apparent from the description and from the claims.

In this application:

"water dispersible polymers" means polymers which may form or be obtained in the form of an aqueous solution, aqueous suspension, aqueous emulsion or aqueous latex;

"(meth)acrylate monomers" include acrylate monomers and methacrylate monomers; and "(meth)acrylate polymers" includes polymers that include units derived from acrylate monomers, polymers that include units derived from methacrylate monomers, and polymers that include both units derived from acrylate monomers and units derived from methacrylate monomers; and "non-syntactic" means, with regard to foamed or porous materials, that the majority of pores of the material are not created by addition of hollow structures such as, e.g., microballoons or hollow microspheres.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides printable durable labels and components thereof, including ink-receptive layers, as well as coatable compositions such as may be used to make such ink-receptive layers.

The coatable compositions and ink-receptive layers contain relatively high loadings of small-diameter colloidal silica particles. Despite the relatively high loadings of silica particles, the ink-receptive layers display high gloss, yet they also possess high affinity for printable inks. In addition, high scratch and smear resistance was also observed.

Figure 1:
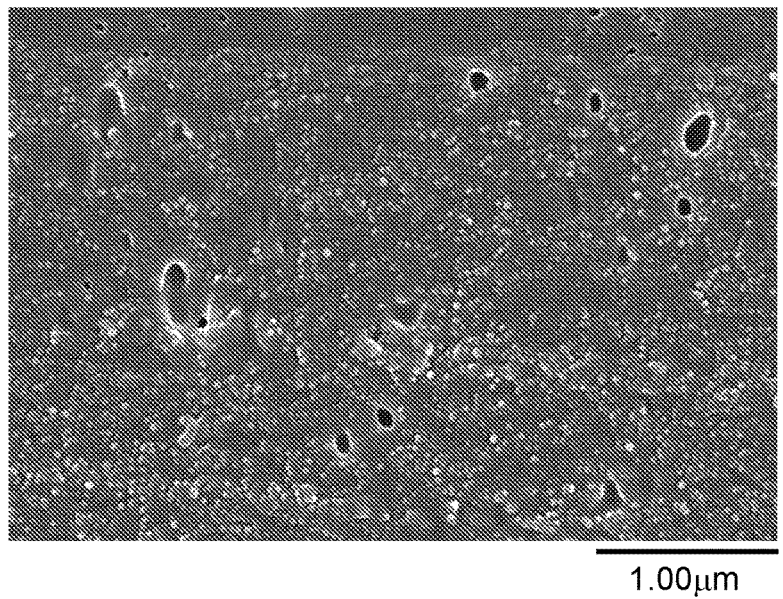
FIG. 1 is a micrograph of a cross-section of an ink-receptive layer according to one embodiment of the present disclosure, described below as Example 5, which included 20 nanometer colloidal silica particles.
Figure 2:
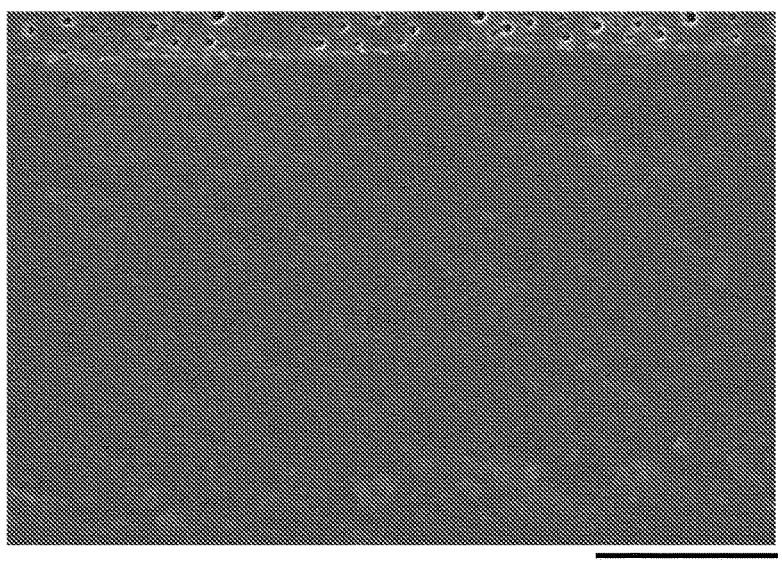
FIG. 2 is a micrograph of a cross-section of a comparative layer, described below as Comparative Example 4, which included no silica.
Figure 3:
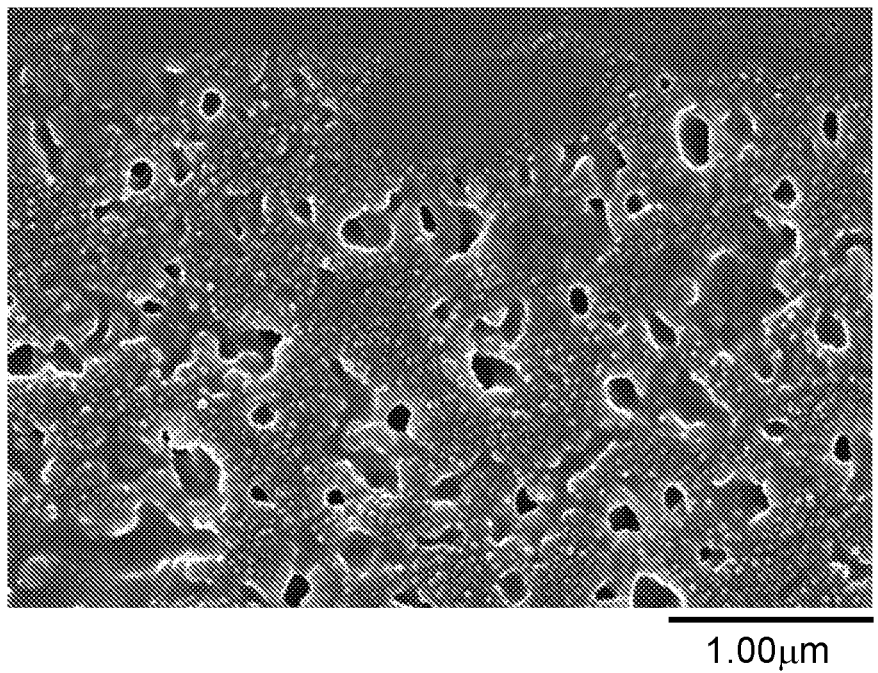
FIG. 3 is a micrograph of a cross-section of an ink-receptive layer according to one embodiment of the present disclosure, described below as Example 3, which included 20 nanometer colloidal silica particles.
Figure 4:
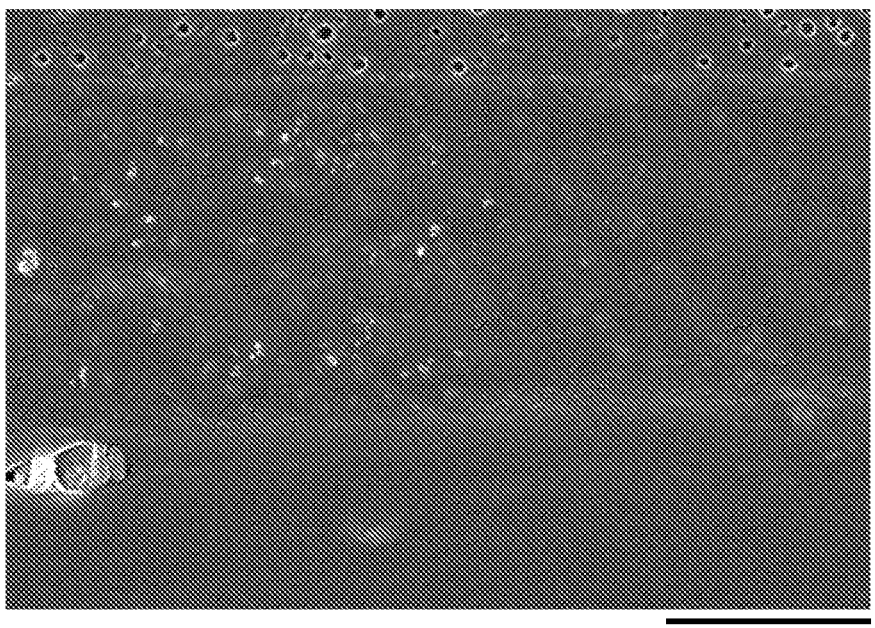
FIG. 4 is a micrograph of a cross-section of a comparative layer, described below as Comparative Example 6, which included fumed silica.

In some embodiments, the ink-receptive layers exhibit an unusual structure. FIGS. 1 and 3 are micrographs of cross-sections of two ink-receptive layers according to two embodiments of the present disclosure, described below as Examples 5 and 3, respectively. Each of these two embodiments included 20 nanometer colloidal silica particles. In contrast, FIG. 2 is a micrograph of a cross-section of a comparative layer, described below as Comparative Example 4, which included no silica, and FIG. 4 is a micrograph of a cross-section of a comparative layer, described below as Comparative Example 6, which included fumed silica. It can be seen that the ink-receptive layers according to Examples 5 and 3 have a porous structure, while Comparative Examples 4 and 6 did not. Please note that in each of FIGS. 1-4, an epoxy embedding resin (which may be porous) is visible in a band across the top margin of the image, and the layer immediately below is the ink-receptive layer. Without wishing to be bound by theory, applicants believe that this unusual structure may play a role in the ability of the ink-receptive layers of the present disclosure to simultaneously achieve conflicting goals: high gloss, high affinity for printable inks, and high durability (e.g., high scratch and smear resistance).

In some embodiments, the ink-receptive layers exhibit unusual surface smoothness. In some embodiments, surface smoothness (i.e., lack of roughness) may be measured by atomic force microscopy (AFM). One method of using AFM is detailed in the Examples below. In some embodiments, the ink-receptive layers exhibit surface smoothness to the extent that Ra is less than 35 nm, in some embodiments less than 30 nm, in some embodiments less than 25 nm, and in some embodiments less than 20 nm, despite inclusion of colloidal silica particles. In some embodiments, the ink-receptive layers exhibit surface smoothness to the extent that Rq is less than 30 nm, in some embodiments less than 25 nm, in some embodiments less than 20 nm, and in some embodiments less than 10 nm, despite inclusion of colloidal silica particles.

The coatable compositions of the present disclosure are typically aqueous suspensions. In some embodiments, all constituents of the suspension other than water or solvents are in suspension. In some embodiments, some constituents of the suspension are in suspension and some are partly or fully dissolved. In some embodiments, the suspension is in water without additional solvents. In some embodiments, the suspension is in water and additional water-miscible solvents. In some embodiments, the suspension is in water and additional water-soluble solvents. The coatable composition of the present disclosure may optionally include a coalescing agent. Any suitable coalescing agent may be used in the practice of the present disclosure. In some embodiments, the coalescing agent may be one or more of N-methylpyrrolidone (NMP) or di(propylene glycol) methyl ether (DPGME). In some embodiments, the suspension has a pH of 4-10, in some 5-9, and in some 6-8.

The coatable composition of the present disclosure may be made by any suitable means. Typically, the coatable composition of the present disclosure may be made by mixing of its components. In some embodiments, the coatable composition of the present disclosure is maintained at a high pH during mixing, in some embodiments at a pH of 4-10, in some 5-9, and in some 6-8.

Any suitable colloidal silica may be used in the practice of the present disclosure. Colloidal silica is a form of silicon dioxide having an amorphous structure, distinguished from crystalline forms of silicon dioxide. Colloidal silica may comprise approximately spherical particles. Colloidal silica may comprise particles having an average diameter of 2 to 150 nanometers. Colloidal silica may be maintained in a largely unaggregated and unagglomerated form, typically in aqueous suspension at basic pH or slightly acidic. Colloidal silica is distinguished from non-colloidal silica such as fumed silica and silica gels, which comprise aggregated, agglomerated, or fused silica particles. Colloidal silica used in the practice of the present disclosure have an average particle diameter of 2 to 150 nanometers, in some such embodiments greater than 3 nanometers, in some greater than 4 nanometers, in some greater than 6 nanometers, in some greater than 7 nanometers, in some greater than 8 nanometers, in some greater than 13 nanometers, and in some greater than 18 nanometers. In some such embodiments, average silica particle diameter is less than 115 nanometers, in some less than 95 nanometers, in some less than 75 nanometers, in some less than 48 nanometers, in some less than 32 nanometers, and in some such embodiments less than 27 nanometers. In some embodiments, the silica particles are monodisperse, where 90% or more of the particles fall within +/−3 nm, +/−5 nm, or +/−10 nm of the average particle diameter. In some embodiments the silica particles are not surface-modified. In some embodiments the silica particles are not surface-modified by attachment of organic molecules to the particle surface. In some embodiments the silica particles are not surface-modified by covalent attachment of organic molecules to the particle surface. In some embodiments the silica particles are not surface-modified by ionic attachment of organic molecules to the particle surface. In some embodiments, the silica particles comprise hydroxy groups (e.g., in the form of silanol groups) on the particle surface.

Any suitable polyester polymers may be used in the practice of the present disclosure. In some embodiments, suitable polyester polymers are sulfonated. In some embodiments, suitable polyester polymers are not sulfonated. Suitable sulfonated and non-sulfonated polyester polymers may include those described in WO 03/029015, the content of which is herein incorporated by reference. In some embodiments, suitable polyester polymers are copolyesters. In some embodiments, suitable polyester polymers are polyester-polyether copolyesters. In some embodiments, suitable polyester polymers are grafted with additional polymeric material. In some embodiments, suitable polyester polymers are not grafted with additional polymeric material. In some embodiments, suitable polyester polymers are branched. In some embodiments, suitable polyester polymers are not branched. In some embodiments, suitable polyester polymers are carboxyl-terminated. In some embodiments, suitable polyester polymers are hydroxy-terminated. In some embodiments, suitable polyester polymers comprise not more than 40 weight percent of monomer units derived from monomers other than polyacid or polyol monomers, in some not more than 30 weight percent, in some not more than 20 weight percent, in some not more than 10 weight percent, in some not more than 5 weight percent, and in some embodiments not more than 1 weight percent.

Any suitable polyurethane polymers may be used in the practice of the present disclosure. In some embodiments, suitable polyurethane polymers have an aliphatic backbone structure. In some embodiments, suitable polyurethane polymers are non-aromatic. In some embodiments, suitable polyurethane polymers are grafted with additional polymeric material. In some embodiments, suitable polyurethane polymers are not grafted with additional polymeric material. In some embodiments, suitable polyurethane polymers are branched. In some embodiments, suitable polyurethane polymers are not branched. In some embodiments, suitable polyurethane polymers are carboxyl-terminated. In some embodiments, suitable polyurethane polymers comprise not more than 40 weight percent of monomer units derived from monomers other than polyisocyanate or polyols monomers, in some not more than 30 weight percent, in some not more than 20 weight percent, in some not more than 10 weight percent, in some not more than 5 weight percent, and in some embodiments not more than 1 weight percent.

Any suitable (meth)acrylate polymers may be used in the practice of the present disclosure. In some embodiments, suitable (meth)acrylate polymers are in the form of a core-shell particles in a latex. Suitable (meth)acrylate polymers, including core-shell (meth)acrylate polymers, may include those described in U.S. Pat. No. 5,461,125, the content of which is herein incorporated by reference. In some embodiments, suitable (meth)acrylate polymers are grafted with additional polymeric material. In some embodiments, suitable (meth)acrylate polymers are not grafted with additional polymeric material. In some embodiments, suitable (meth)acrylate polymers are branched. In some embodiments, suitable (meth)acrylate polymers are not branched. In some embodiments, suitable (meth)acrylate polymers comprise not more than 40 weight percent of monomer units derived from monomers other than (meth)acrylate monomers, in some not more than 30 weight percent, in some not more than 20 weight percent, in some not more than 10 weight percent, in some not more than 5 weight percent, and in some embodiments not more than 1 weight percent.

Any suitable crosslinkers may be used in the practice of the present disclosure. In some embodiments, suitable crosslinkers are reactive with polyesters. In some embodiments, suitable crosslinkers are reactive with polyesters and polyurethanes. In some embodiments, suitable crosslinkers are reactive with polyesters and (meth)acrylates. In some embodiments, the crosslinkers are selected from polyaziridines comprising two or more aziridine groups. In some embodiments, the crosslinkers are selected from carbodiimide crosslinkers. In some embodiments, the crosslinkers are selected from isocyanate crosslinkers. In some embodiments, the crosslinkers are selected from silane crosslinkers. In some embodiments, the crosslinkers are selected from metal complex crosslinkers. In some embodiments, the crosslinkers are selected from UV-activated crosslinking systems. In some embodiments, the crosslinkers do not include UV-activated crosslinking systems. In some embodiments, the crosslinkers are heat-activated crosslinking systems.

Ink-receptive layers according to the present disclosure may be made by any suitable means. In some embodiments, ink-receptive layers according to the present disclosure are made by coating out the coatable composition of the present disclosure. Coating may be accomplished by any suitable means, which may include spraying, bar coating, dipping, brushing, curtain coating, roll coating, gravure coating, screen printing, and the like. In some embodiments, coating is performed on a substrate. In some embodiments, coating step(s) may be followed by drying steps. In some embodiments, coating step(s) may be followed by steps promoting reaction of crosslinker(s), if present, with polymers. In some embodiments, drying steps and steps promoting reaction of crosslinker(s) are carried out simultaneously, e.g., by application of heat. In some embodiments, steps promoting reaction of crosslinker(s) are carried out by application of UV radiation.

Any suitable substrates may be used in the practice of the present disclosure. In some embodiments, the substrate may comprise one or more of polyester, polyethylene terephthalate (PET), polypropylene (PP), vinyl, polyolefins or polyvinyl chloride (PVC). In some embodiments, additional layers may be added to the substrate. In some embodiments, such additional layers may include adhesive layers. In some embodiments, the substrate bears an adhesive layer on the face opposite the face bearing the ink-receptive layer. In some such embodiments, the adhesive is a pressure sensitive adhesive (PSA). In some embodiments including an adhesive layer, the adhesive layer is covered with a liner.

In some embodiments, the ink-receptive layer of the present disclosure readily anchors one, more, or many inks types, which may include one or more of: water-based inks, organic solvent-based inks, and UV curable inks. In some embodiments, the ink-receptive layer of the present disclosure may be readily used with one, more, or many printing technologies, which may include one or more of: flexographic, ink jet, and thermal transfer technologies.

Additional embodiments may include those limited to the compositions or ranges recited in the Selected Embodiments below.

SELECTED EMBODIMENTS

The following embodiments, designated by letter and number, are intended to further illustrate the present disclosure but should not be construed to unduly limit this disclosure.

CC1. A coatable composition for formation of an ink-receptive layer, the coatable composition comprising a mixture of:
- a) 8.0-75 wt %, based on the total weight of a), b), c), and d), of colloidal silica particles having an average particle size of 2.0-150 nm;
- b) 10-75 wt %, based on the total weight of a), b), c), and d), of one or more polyester polymers;
- c) 10-75 wt %, based on the total weight of a), b), c), and d), of one or more polymers selected from the group consisting of polyurethane polymers and (meth)acrylate polymers; and
- d) 0-10 wt %, based on the total weight of a), b), c), and d), of one or more crosslinkers.

CC2. The coatable composition according to embodiment CC1 which is an aqueous suspension.

CC3. The coatable composition according to any of the previous embodiments wherein the colloidal silica particles are present in an amount of at least 12.0 wt %, based on the total weight of a), b), c), and d).

CC4. The coatable composition according to any of the previous embodiments wherein the colloidal silica particles are present in an amount of at least 22.0 wt %, based on the total weight of a), b), c), and d).

CC5. The coatable composition according to any of the previous embodiments wherein the colloidal silica particles are present in an amount of at least 27.0 wt %, based on the total weight of a), b), c), and d).

CC6. The coatable composition according to any of the previous embodiments wherein the colloidal silica particles are present in an amount of at least 32.0 wt %, based on the total weight of a), b), c), and d).

CC7. The coatable composition according to any of the previous embodiments wherein the colloidal silica particles are present in an amount of at least 35.0 wt %, based on the total weight of a), b), c), and d).

CC8. The coatable composition according to any of the previous embodiments wherein the colloidal silica particles are present in an amount of not more than 65.0 wt %, based on the total weight of a), b), c), and d).

CC9. The coatable composition according to any of the previous embodiments wherein the colloidal silica particles are present in an amount of not more than 57.0 wt %, based on the total weight of a), b), c), and d).

CC10. The coatable composition according to any of the previous embodiments wherein the colloidal silica particles are present in an amount of not more than 50.0 wt %, based on the total weight of a), b), c), and d).

CC11. The coatable composition according to any of the previous embodiments wherein the colloidal silica particles have an average particle size of at least 4.0 nm.

CC12. The coatable composition according to any of the previous embodiments wherein the colloidal silica particles have an average particle size of at least 13.0 nm.

CC13. The coatable composition according to any of the previous embodiments wherein the colloidal silica particles have an average particle size of not more than 95.0 nm.

CC14. The coatable composition according to any of the previous embodiments wherein the colloidal silica particles have an average particle size of not more than 48.0 nm.

CC15. The coatable composition according to any of the previous embodiments wherein the colloidal silica particles have an average particle size of not more than 35.0 nm.

CC16. The coatable composition according to any of the previous embodiments wherein the colloidal silica particles have an average particle size of not more than 27.0 nm.

CC17. The coatable composition according to any of the previous embodiments wherein the one or more polyester polymers are present in an amount of at least 15.0 wt %, based on the total weight of a), b), c), and d).

CC18. The coatable composition according to any of the previous embodiments wherein the one or more polyester polymers are present in an amount of at least 27.0 wt %, based on the total weight of a), b), c), and d).

CC19. The coatable composition according to any of the previous embodiments wherein the one or more polyester polymers are present in an amount of at least 32.0 wt %, based on the total weight of a), b), c), and d).

CC20. The coatable composition according to any of the previous embodiments wherein the one or more polyester polymers are present in an amount of at least 40.0 wt %, based on the total weight of a), b), c), and d).

CC21. The coatable composition according to any of the previous embodiments wherein the one or more polyester polymers are present in an amount of not more than 58.0 wt %, based on the total weight of a), b), c), and d).

CC22. The coatable composition according to any of the previous embodiments wherein the one or more polyester polymers are present in an amount of not more than 48.0 wt %, based on the total weight of a), b), c), and d).

CC23. The coatable composition according to any of the previous embodiments wherein c) is present in an amount of at least 14.0 wt %, based on the total weight of a), b), c), and d).

CC24. The coatable composition according to any of the previous embodiments wherein c) is present in an amount of at least 18.0 wt %, based on the total weight of a), b), c), and d).

CC25. The coatable composition according to any of the previous embodiments wherein c) is present in an amount of at least 21.0 wt %, based on the total weight of a), b), c), and d).

CC26. The coatable composition according to any of the previous embodiments wherein c) is present in an amount of not more than 63.0 wt %, based on the total weight of a), b), c), and d).

CC27. The coatable composition according to any of the previous embodiments wherein c) is present in an amount of not more than 48.0 wt %, based on the total weight of a), b), c), and d).

CC28. The coatable composition according to any of the previous embodiments wherein c) is present in an amount of not more than 38.0 wt %, based on the total weight of a), b), c), and d).

CC29. The coatable composition according to any of the previous embodiments wherein c) is present in an amount of not more than 28.0 wt %, based on the total weight of a), b), c), and d).

CC30. The coatable composition according to any of the previous embodiments wherein the one or more crosslinkers are present in an amount of at least 0.1 wt %, based on the total weight of a), b), c), and d).

CC31. The coatable composition according to any of the previous embodiments wherein the one or more crosslinkers are present in an amount of at least 1.0 wt %, based on the total weight of a), b), c), and d).

CC32. The coatable composition according to any of the previous embodiments wherein the one or more crosslinkers are present in an amount of at least 2.0 wt %, based on the total weight of a), b), c), and d).

CC33. The coatable composition according to any of the previous embodiments wherein the one or more crosslinkers are present in an amount of not more than 7.0 wt %, based on the total weight of a), b), c), and d).

CC34. The coatable composition according to any of the previous embodiments wherein the one or more crosslinkers are present in an amount of not more than 4.5 wt %, based on the total weight of a), b), c), and d).

CC35. The coatable composition according to any of the previous embodiments wherein the one or more polyester polymers include sulfonated polyester polymers.

CC36. The coatable composition according to any of the previous embodiments wherein the one or more polyester polymers include non-sulfonated polyester polymers.

CC37. The coatable composition according to any of embodiments CC1-CC34 wherein the one or more polyester polymers are sulfonated polyester polymers.

CC38. The coatable composition according to any of embodiments CC1-CC34 wherein the one or more polyester polymers are non-sulfonated polyester polymers.

CC39. The coatable composition according to any of the previous embodiments wherein c) includes one or more polyurethane polymers.

CC40. The coatable composition according to any of the previous embodiments wherein c) includes one or more polyurethane polymers having an aliphatic backbone.

CC41. The coatable composition according to any of the previous embodiments wherein c) includes one or more (meth)acrylate polymers.

CC42. The coatable composition according to any of the previous embodiments wherein c) includes one or more (meth)acrylate polymers in the form of core-shell particles.

CC43. The coatable composition according to any of embodiments CC1-CC38 wherein c) is one or more polyurethane polymers.

CC44. The coatable composition according to any of embodiments CC1-CC38 wherein c) is one or more polyurethane polymers having an aliphatic backbone.

CC45. The coatable composition according to any of embodiments CC1-CC38 wherein c) is one or more (meth)acrylate polymers.

CC46. The coatable composition according to any of embodiments CC1-CC38 wherein c) is one or more (meth)acrylate polymers in the form of core-shell particles.

CC47. The coatable composition according to any of the previous embodiments wherein the one or more crosslinkers include one or more polyaziridines.

CC48. The coatable composition according to any of embodiments CC1-CC46 wherein the one or more crosslinkers are one or more polyaziridines.

L1. An ink-receptive layer comprising a mixture of:
   a) 8.0-75 wt %, based on the total weight of a), b), and c), of colloidal silica particles having an average particle size of 2.0-150 nm;
   b) 10-75 wt %, based on the total weight of a), b), and c), of one or more polyester polymers; and
   c) 10-75 wt %, based on the total weight of a), b), and c), of one or more polymers selected from the group consisting of polyurethane polymers and (meth)acrylate polymers.

L2. The ink-receptive layer according to embodiment L1 wherein the colloidal silica particles are present in an amount of at least 12.0 wt %, based on the total weight of a), b), and c).

L3. The ink-receptive layer according to embodiment L1 wherein the colloidal silica particles are present in an amount of at least 22.0 wt %, based on the total weight of a), b), and c).

L4. The ink-receptive layer according to any embodiment L1 wherein the colloidal silica particles are present in an amount of at least 27.0 wt %, based on the total weight of a), b), and c).

L5. The ink-receptive layer according to embodiment L1 wherein the colloidal silica particles are present in an amount of at least 32.0 wt %, based on the total weight of a), b), and c).

L6. The ink-receptive layer according to embodiment L1 wherein the colloidal silica particles are present in an amount of at least 35.0 wt %, based on the total weight of a), b), and c).

L7. The ink-receptive layer according to any of embodiments L1-L6 wherein the colloidal silica particles are present in an amount of not more than 65.0 wt %, based on the total weight of a), b), and c).

L8. The ink-receptive layer according to any of embodiments L1-L6 wherein the colloidal silica particles are present in an amount of not more than 57.0 wt %, based on the total weight of a), b), and c).

L9. The ink-receptive layer according to any of embodiments L1-L6 wherein the colloidal silica particles are present in an amount of not more than 50.0 wt %, based on the total weight of a), b), and c).

L10. The ink-receptive layer according to any of embodiments L1-L9 wherein the colloidal silica particles have an average particle size of at least 4.0 nm.

L11. The ink-receptive layer according to any of embodiments L1-L9 wherein the colloidal silica particles have an average particle size of at least 13.0 nm.

L12. The ink-receptive layer according to any of embodiments L1-L11 wherein the colloidal silica particles have an average particle size of not more than 95.0 nm.

L13. The ink-receptive layer according to any of embodiments L1-L11 wherein the colloidal silica particles have an average particle size of not more than 48.0 nm.

L14. The ink-receptive layer according to any of embodiments L1-L11 wherein the colloidal silica particles have an average particle size of not more than 35.0 nm.

L15. The ink-receptive layer according to any of embodiments L1-L11 wherein the colloidal silica particles have an average particle size of not more than 27.0 nm.

L16. The ink-receptive layer according to any of embodiments L1-L15 wherein the one or more polyester polymers are present in an amount of at least 15.0 wt %, based on the total weight of a), b), and c).

L17. The ink-receptive layer according to any of embodiments L1-L15 wherein the one or more polyester polymers are present in an amount of at least 27.0 wt %, based on the total weight of a), b), and c).

L18. The ink-receptive layer according to any of embodiments L1-L15 wherein the one or more polyester polymers are present in an amount of at least 32.0 wt %, based on the total weight of a), b), and c).

L19. The ink-receptive layer according to any of embodiments L1-L15 wherein the one or more polyester polymers are present in an amount of at least 40.0 wt %, based on the total weight of a), b), and c).

L20. The ink-receptive layer according to any of embodiments L1-L19 wherein the one or more polyester polymers are present in an amount of not more than 58.0 wt %, based on the total weight of a), b), and c).

L21. The ink-receptive layer according to any of embodiments L1-L19 wherein the one or more polyester polymers are present in an amount of not more than 48.0 wt %, based on the total weight of a), b), and c).

L22. The ink-receptive layer according to any of embodiments L1-L21 wherein c) is present in an amount of at least 14.0 wt %, based on the total weight of a), b), and c).

L23. The ink-receptive layer according to any of embodiments L1-L21 wherein c) is present in an amount of at least 18.0 wt %, based on the total weight of a), b), and c).

L24. The ink-receptive layer according to any of embodiments L1-L21 wherein c) is present in an amount of at least 21.0 wt %, based on the total weight of a), b), and c).

L25. The ink-receptive layer according to any of embodiments L1-L24 wherein c) is present in an amount of not more than 63.0 wt %, based on the total weight of a), b), and c).

L26. The ink-receptive layer according to any of embodiments L1-L24 wherein c) is present in an amount of not more than 48.0 wt %, based on the total weight of a), b), and c).

L27. The ink-receptive layer according to any of embodiments L1-L24 wherein c) is present in an amount of not more than 38.0 wt %, based on the total weight of a), b), and c).

L28. The ink-receptive layer according to any of embodiments L1-L24 wherein c) is present in an amount of not more than 28.0 wt %, based on the total weight of a), b), and c).

L29. The ink-receptive layer according to any of embodiments L1-L28 wherein the one or more polyester polymers include sulfonated polyester polymers.

L30. The ink-receptive layer according to any of embodiments L1-L29 wherein the one or more polyester polymers include non-sulfonated polyester polymers.

L31. The ink-receptive layer according to any of embodiments L1-L28 wherein the one or more polyester polymers are sulfonated polyester polymers.

L32. The ink-receptive layer according to any of embodiments L1-L28 wherein the one or more polyester polymers are non-sulfonated polyester polymers.

L33. The ink-receptive layer according to any of embodiments L1-L32 wherein c) includes one or more polyurethane polymers.

L34. The ink-receptive layer according to any of embodiments L1-L32 wherein c) includes one or more polyurethane polymers having an aliphatic backbone.

L35. The ink-receptive layer according to any of embodiments L1-L34 wherein c) includes one or more (meth)acrylate polymers.

L36. The ink-receptive layer according to any of embodiments L1-L34 wherein c) includes one or more (meth)acrylate polymers in the form of core-shell particles.

L37. The ink-receptive layer according to any of embodiments L1-L32 wherein c) is one or more polyurethane polymers.

L38. The ink-receptive layer according to any of embodiments L1-L32 wherein c) is one or more polyurethane polymers having an aliphatic backbone.

L39. The ink-receptive layer according to any of embodiments L1-L32 wherein c) is one or more (meth)acrylate polymers.

L40. The ink-receptive layer according to any of embodiments L1-L32 wherein c) is one or more (meth)acrylate polymers in the form of core-shell particles.

L41. The ink-receptive layer according to any of embodiments L1-L40 having a 60 degree gloss of at least 50.

L42. The ink-receptive layer according to any of embodiments L1-L40 having a 60 degree gloss of at least 60.

L43. The ink-receptive layer according to any of embodiments L1-L40 having a 60 degree gloss of at least 70.

L44. The ink-receptive layer according to any of embodiments L1-L40 having a 60 degree gloss of at least 80.

L45. The ink-receptive layer according to any of embodiments L1-L44 which includes pores having a diameter of 0.05 micrometers or greater, and wherein such pores are present in a density such that a cross-section of the ink-receptive layer intersects 1 or more of such pores per 4.0 square micrometers.

L46. The ink-receptive layer according to any of embodiments L1-L44 which includes pores having a diameter of 0.05 micrometers or greater, and wherein such pores are present in a density such that a cross-section of the ink-receptive layer intersects 3 or more of such pores per 4.0 square micrometers.

L47. The ink-receptive layer according to any of embodiments L1-L44 which includes pores having a diameter of 0.05 micrometers or greater, and wherein such pores are present in a density such that a cross-section of the ink-receptive layer intersects 8 or more of such pores per 4.0 square micrometers.

L48. The ink-receptive layer according any of embodiments L1-L44 which includes pores having a diameter of 0.1 micrometers or greater, and wherein such pores are present in a density such that a cross-section of the ink-receptive layer intersects 1 or more of such pores per 4.0 square micrometers.

L49. The ink-receptive layer according to any of embodiments L1-L44 which includes pores having a diameter of 0.1 micrometers or greater, and wherein such pores are present in a density such that a cross-section of the ink-receptive layer intersects 3 or more of such pores per 4.0 square micrometers.

L50. The ink-receptive layer according to any of embodiments L1-L44 which includes pores having a diameter of 0.1 micrometers or greater, and wherein such pores are present in a density such that a cross-section of the ink-receptive layer intersects 8 or more of such pores per 4.0 square micrometers.

L51. The ink-receptive layer according to any of embodiments L1-L50, wherein the pores have an average pore size of not more than 0.5 micrometers.

L52. The ink-receptive layer according to any of embodiments L1-L50, wherein the pores have an average pore size of not more than 0.3 micrometers.

L53. The ink-receptive layer according to any of embodiments L1-L52, wherein the pores are non-syntactic.

LX1. An ink-receptive layer comprising a mixture of:
  I) 8.0-75 wt %, based on the total weight of I) and II), of colloidal silica particles having an average particle size of 2.0-150 nm; and
  II) crosslinked polymer obtained by reacting to form crosslinks a mixture of:
    b) 20-80 wt %, based on the total weight of b), c), and d), of one or more polyester polymers;
    c) 20-80 wt %, based on the total weight of b), c), and d), of one or more polymers selected from the group consisting of polyurethane polymers and (meth)acrylate polymers; and d) 0.1-12 wt %, based on the total weight of b), c), and d), of one or more crosslinkers.

LX2. The ink-receptive layer according to embodiment LX1 wherein the colloidal silica particles are present in an amount of at least 12.0 wt %, based on the total weight of I) and II).

LX3. The ink-receptive layer according to embodiment LX1 wherein the colloidal silica particles are present in an amount of at least 22.0 wt %, based on the total weight of I) and II).

LX4. The ink-receptive layer according to any embodiment LX1 wherein the colloidal silica particles are present in an amount of at least 27.0 wt %, based on the total weight of I) and II).

LX5. The ink-receptive layer according to embodiment LX1 wherein the colloidal silica particles are present in an amount of at least 32.0 wt %, based on the total weight of I) and II).

LX6. The ink-receptive layer according to embodiment LX1 wherein the colloidal silica particles are present in an amount of at least 35.0 wt %, based on the total weight of I) and II).

LX7. The ink-receptive layer according to any of embodiments LX1-LX6 wherein the colloidal silica particles are present in an amount of not more than 65.0 wt %, based on the total weight of I) and II).

LX8. The ink-receptive layer according to any of embodiments LX1-LX6 wherein the colloidal silica particles are present in an amount of not more than 57.0 wt %, based on the total weight of I) and II).

LX9. The ink-receptive layer according to any of embodiments LX1-LX6 wherein the colloidal silica particles are present in an amount of not more than 50.0 wt %, based on the total weight of I) and II).

LX10. The ink-receptive layer according to any of embodiments LX1-LX9 wherein the colloidal silica particles have an average particle size of at least 4.0 nm.

LX11. The ink-receptive layer according to any of embodiments LX1-LX9 wherein the colloidal silica particles have an average particle size of at least 13.0 nm.

LX12. The ink-receptive layer according to any of embodiments LX1-LX11 wherein the colloidal silica particles have an average particle size of not more than 95.0 nm.

LX13. The ink-receptive layer according to any of embodiments LX1-LX11 wherein the colloidal silica particles have an average particle size of not more than 48.0 nm.

LX14. The ink-receptive layer according to any of embodiments LX1-LX11 wherein the colloidal silica particles have an average particle size of not more than 35.0 nm.

LX15. The ink-receptive layer according to any of embodiments LX1-LX11 wherein the colloidal silica particles have an average particle size of not more than 27.0 nm.

LX16. The ink-receptive layer according to any of embodiments LX1-LX15 wherein the one or more polyester polymers are present in an amount of at least 25.0 wt %, based on the total weight of b), c), and d).

LX17. The ink-receptive layer according to any of embodiments LX1-LX15 wherein the one or more polyester polymers are present in an amount of at least 30.0 wt %, based on the total weight of b), c), and d).

LX18. The ink-receptive layer according to any of embodiments LX1-LX15 wherein the one or more polyester polymers are present in an amount of at least 40.0 wt %, based on the total weight of b), c), and d).

LX19. The ink-receptive layer according to any of embodiments LX1-LX15 wherein the one or more polyester polymers are present in an amount of at least 50.0 wt %, based on the total weight of b), c), and d).

LX20. The ink-receptive layer according to any of embodiments LX1-LX19 wherein the one or more polyester polymers are present in an amount of not more than 70.0 wt %, based on the total weight of b), c), and d).

LX21. The ink-receptive layer according to any of embodiments LX1-LX19 wherein the one or more polyester polymers are present in an amount of not more than 60.0 wt %, based on the total weight of b), c), and d).

LX22. The ink-receptive layer according to any of embodiments LX1-LX21 wherein c) is present in an amount of at least 23.0 wt %, based on the total weight of b), c), and d).

LX23. The ink-receptive layer according to any of embodiments LX1-LX21 wherein c) is present in an amount of at least 26.0 wt %, based on the total weight of b), c), and d).

LX24. The ink-receptive layer according to any of embodiments LX1-LX21 wherein c) is present in an amount of at least 28.0 wt %, based on the total weight of b), c), and d).

LX25. The ink-receptive layer according to any of embodiments LX1-LX24 wherein c) is present in an amount of not more than 63.0 wt %, based on the total weight of b), c), and d).

LX26. The ink-receptive layer according to any of embodiments LX1-LX24 wherein c) is present in an amount of not more than 48.0 wt %, based on the total weight of b), c), and d).

LX27. The ink-receptive layer according to any of embodiments LX1-LX24 wherein c) is present in an amount of not more than 38.0 wt %, based on the total weight of b), c), and d).

LX28. The ink-receptive layer according to any of embodiments LX1-LX24 wherein c) is present in an amount of not more than 34.0 wt %, based on the total weight of b), c), and d).

LX29. The coatable composition according to any of embodiments LX1-LX28 wherein the one or more crosslinkers are present in an amount of at least 0.5 wt %, based on the total weight of b), c), and d).

LX30. The coatable composition according to any of embodiments LX1-LX28 wherein the one or more crosslinkers are present in an amount of at least 1.0 wt %, based on the total weight of b), c), and d).

LX31. The coatable composition according to any of embodiments LX1-LX28 wherein the one or more crosslinkers are present in an amount of at least 2.5 wt %, based on the total weight of b), c), and d).

LX32. The coatable composition according to any of embodiments LX1-LX31 wherein the one or more crosslinkers are present in an amount of not more than 9.0 wt %, based on the total weight of b), c), and d).

LX33. The coatable composition according to any of embodiments LX1-LX31 wherein the one or more crosslinkers are present in an amount of not more than 6.0 wt %, based on the total weight of b), c), and d).

LX34. The ink-receptive layer according to any of embodiments LX1-LX33 wherein the one or more polyester polymers include sulfonated polyester polymers.

LX35. The ink-receptive layer according to any of embodiments LX1-LX34 wherein the one or more polyester polymers include non-sulfonated polyester polymers.

LX36. The ink-receptive layer according to any of embodiments LX1-LX33 wherein the one or more polyester polymers are sulfonated polyester polymers.

LX37. The ink-receptive layer according to any of embodiments LX1-LX33 wherein the one or more polyester polymers are non-sulfonated polyester polymers.

LX38. The ink-receptive layer according to any of embodiments LX1-LX37 wherein c) includes one or more polyurethane polymers.

LX39. The ink-receptive layer according to any of embodiments LX1-LX38 wherein c) includes one or more polyurethane polymers having an aliphatic backbone.

LX40. The ink-receptive layer according to any of embodiments LX1-LX39 wherein c) includes one or more (meth) acrylate polymers.

LX41. The ink-receptive layer according to any of embodiments LX1-LX40 wherein c) includes one or more (meth) acrylate polymers in the form of core-shell particles.

LX42. The ink-receptive layer according to any of embodiments LX1-LX37 wherein c) is one or more polyurethane polymers.

LX43. The ink-receptive layer according to any of embodiments LX1-LX37 wherein c) is one or more polyurethane polymers having an aliphatic backbone.

LX44. The ink-receptive layer according to any of embodiments LX1-LX37 wherein c) is one or more (meth)acrylate polymers.

LX45. The ink-receptive layer according to any of embodiments LX1-LX37 wherein c) is one or more (meth)acrylate polymers in the form of core-shell particles.

LX46. The coatable composition according to any of embodiments LX1-LX45 wherein the one or more cross-linkers include one or more polyaziridines.

LX47. The coatable composition according to any of embodiments LX1-LX45 wherein the one or more cross-linkers are one or more polyaziridines.

LX48. The ink-receptive layer according to any of embodiments LX1-LX47 having a 60 degree gloss of at least 50.

LX49. The ink-receptive layer according to any of embodiments LX1-LX47 having a 60 degree gloss of at least 60.

LX50. The ink-receptive layer according to any of embodiments LX1-LX47 having a 60 degree gloss of at least 70.

LX51. The ink-receptive layer according to any of embodiments LX1-LX47 having a 60 degree gloss of at least 80.

LX52. The ink-receptive layer according to any of embodiments LX1-LX51 which includes pores having a diameter of 0.05 micrometers or greater, and wherein such pores are present in a density such that a cross-section of the ink-receptive layer intersects 1 or more of such pores per 4.0 square micrometers.

LX53. The ink-receptive layer according to any of embodiments LX1-LX51 which includes pores having a diameter of 0.05 micrometers or greater, and wherein such pores are present in a density such that a cross-section of the ink-receptive layer intersects 3 or more of such pores per 4.0 square micrometers.

LX54. The ink-receptive layer according to any of embodiments LX1-LX51 which includes pores having a diameter of 0.05 micrometers or greater, and wherein such pores are present in a density such that a cross-section of the ink-receptive layer intersects 8 or more of such pores per 4.0 square micrometers.

LX55. The ink-receptive layer according any of embodiments LX1-LX51 which includes pores having a diameter of 0.1 micrometers or greater, and wherein such pores are present in a density such that a cross-section of the ink-receptive layer intersects 1 or more of such pores per 4.0 square micrometers.

LX56. The ink-receptive layer according to any of embodiments LX1-LX51 which includes pores having a diameter of 0.1 micrometers or greater, and wherein such pores are present in a density such that a cross-section of the ink-receptive layer intersects 3 or more of such pores per 4.0 square micrometers.

LX57. The ink-receptive layer according to any of embodiments LX1-LX51 which includes pores having a diameter of 0.1 micrometers or greater, and wherein such pores are present in a density such that a cross-section of the ink-receptive layer intersects 8 or more of such pores per 4.0 square micrometers.

LX58. The ink-receptive layer according to any of embodiments LX1-LX57, wherein the pores have an average pore size of not more than 0.5 micrometers.

LX59. The ink-receptive layer according to any of embodiments LX1-LX57, wherein the pores have an average pore size of not more than 0.3 micrometers.

LX60. The ink-receptive layer according to any of embodiments LX1-LX59, wherein the pores are non-syntactic.

PS1. A porous solid, comprising:
  a) 8.0-75 wt % of colloidal silica particles having an average particle size of 2.0-150 nm; and
  b) one or more water dispersible polymers;
wherein the porous solid includes pores having a diameter of 0.05 micrometers or greater, and wherein such pores are present in a density such that a cross-section of the porous solid intersects 1 or more of such pores per 4.0 square micrometers.

PS2. The porous solid according to embodiment PS1, wherein the porous solid includes pores having a diameter of 0.05 micrometers or greater, and wherein such pores are present in a density such that a cross-section of the porous solid intersects 3 or more of such pores per 4.0 square micrometers.

PS3. The porous solid according to embodiment PS1, wherein the porous solid includes pores having a diameter of 0.05 micrometers or greater, and wherein such pores are present in a density such that a cross-section of the porous solid intersects 8 or more of such pores per 4.0 square micrometers.

PS4. The porous solid according to embodiment PS1, wherein the porous solid includes pores having a diameter of 0.1 micrometers or greater, and wherein such pores are present in a density such that a cross-section of the porous solid intersects 1 or more of such pores per 4.0 square micrometers.

PS5. The porous solid according to embodiment PS1, wherein the porous solid includes pores having a diameter of 0.1 micrometers or greater, and wherein such pores are present in a density such that a cross-section of the porous solid intersects 3 or more of such pores per 4.0 square micrometers.

PS6. The porous solid according to embodiment PS1, wherein the porous solid includes pores having a diameter of 0.1 micrometers or greater, and wherein such pores are present in a density such that a cross-section of the porous solid intersects 8 or more of such pores per 4.0 square micrometers.

PS7. The porous solid according to any of embodiments PS1-PS6, wherein the pores have an average pore size of not more than 0.5 micrometers.

PS8. The porous solid according to any of embodiments PS1-PS6, wherein the pores have an average pore size of not more than 0.3 micrometers.

PS9. The porous solid according to any of embodiments PS1-PS8, wherein the pores are non-syntactic.

PS10. The porous solid according to any of embodiments PS1-PS9 wherein the one or more water dispersible polymers include one or more polyester polymers.

PS11. The porous solid according to any of embodiments PS1-PS10 wherein the one or more water dispersible polymers include one or more polyurethane polymers.
PS12. The porous solid according to any of embodiments PS1-PS11 wherein the one or more water dispersible polymers include one or more (meth)acrylate polymers.
PS13. The porous solid according to any of embodiments PS1-PS9 wherein the one or more water dispersible polymers include one or more polyester polymers and one or more polymers selected from polyurethane polymers and (meth)acrylate polymers.
ML1. A construction comprising the ink-receptive layer according to any of embodiments L1-L53 or LX1-LX60 bound to a substrate layer.
ML2. The construction according to embodiment ML1 wherein the substrate layer comprises a material selected from the group consisting of polyester, polyethylene terephthalate (PET), polypropylene (PP), vinyl and polyvinyl chloride (PVC).
ML3. The construction according to embodiment ML1 wherein the substrate layer comprises polyester.
ML4. The construction according to embodiment ML1 wherein the substrate layer comprises polyethylene terephthalate (PET).
ML5. The construction according to any of embodiments ML1-ML4 wherein the ink-receptive layer is directly adjacent to and directly bound to the substrate layer.
MM1. A method comprising a step of coating the coatable composition according to any of embodiments CC1-CC48.
MM2. The method according to embodiment MM1 additionally comprising a step of drying the coatable composition after coating.
MM3. The method according to embodiment MM1 or MM2 additionally comprising a step of obtaining by the coating and drying steps the ink-receptive layer according to any of embodiments L1-L53 or LX1-LX60.

Objects and advantages of this disclosure are further illustrated by the following examples, but the particular materials and amounts thereof recited in these examples, as well as other conditions and details, should not be construed to unduly limit this disclosure.

Examples

Unless otherwise noted, all reagents were obtained or are available from Aldrich Chemical Co., Milwaukee, Wis., or from other commercial chemical suppliers or may be synthesized by known methods. All parts, percentages, ratios, etc. in the examples and the rest of the specification are by weight, unless noted otherwise. The following abbreviations are used: m=meters; cm=centimeters; mm=millimeters; μm=micrometers; ft=feet; in =inch; RPM=revolutions per minute; kg=kilograms; oz=ounces; lb=pounds; Pa=Pascals; sec=seconds; min=minutes; and hr=hours. The terms "weight %", "% by weight", and "wt %" are used interchangeably.

Materials

| Material | Description |
| --- | --- |
| AC1 | AC1 refers to a waterborne core-shell acrylate polymer latex (20 wt. % solids), prepared in a similar fashion as described in Example 1 of U.S. Pat. No. 5,461,125. In particular, a mixture of 78.92 parts of deionized water, 0.3 part Rhodacal ® DS-10 anionic surfactant (sodium dodecyl benzene sulfonate, available from Solvay), 0.28 part Igepal ® CA-897 nonionic surfactant (octylphenoxypoly(ethylenoxy)ethanol from Solvay) and 0.13 part ammonium hydroxide (29% aqueous solution) was stirred and heated under nitrogen in a 4-neck flask equipped with a reflux condenser, thermometer, mechanical stirrer, metering pump and a thermometer. When the temperature of the mixture reached 55° C., a solution of 13 parts ethyl acrylate (EA) and 3.23 parts methyl methacrylate (MMA) was added all at once to the flask contents, with vigorous agitation. The mixture was heated to 60° C. and 0.07 parts potassium persulfate were added. The reaction was allowed to exotherm, then was kept at 80° C., while a mixture of 2.60 parts ethyl acrylate, 1.42 parts N-vinyl pyrrolidone (NVP) and 0.04 parts silane coupling agent (gamma-methacryloxypropyltrimethoxysilane, available under the trade designation SILQUEST A-174 from Momentive Performance Materials, Inc.) was dripped in over a one-hour period. The reaction mixture was agitated and maintained at 80° C. for an additional two hours, after which it was quickly cooled to 25° C. and filtered to collect the stable latex polymer. Solids analysis showed 99.8% conversion of monomers. The resulting core-shell acrylate polymer latex has the following composition. Core: EA/MMA (80/20), $T_g$ = −6° C. (~100 nm). Shell: EA/NVP/Silane (64/35/1), $T_g$ = 2° C. (~5 nm), core/shell ratio: 80/20. |
| AC2 | AC2 refers to an aqueous acrylic emulsion (32 wt. % solids), available from DSM NeoResins, Inc. (Wilmington, MA) under the trade designation NEOCRYL A612. |
| PE1 | PE1 refers to an aqueous dispersion of a sulfonated polyester (20 wt. % solids) which may be prepared following similar procedures as described in Example 6 of U.S. Pat. No. 5,203,884. Specifically, a one gallon reaction vessel is charged with 566.7 g of purified terephthalic acid (47 mole % acid basis), 569.4 g of isophthalic acid (47 mole % acid basis), 121.3 g of 5-sulfoisophthalic acid sodium salt (6 mole % acid basis), 953.4 g of polyester grade ethylene glycol (211 mole % diol basis, glycol excess), 386.7 g of polycaprolactone PCP-0200 (27 mole % diol basis), 1.5 g of antimony acetate (0.12 wt. %), and 2.7 g of sodium acetate (0.21 wt. %). The contents are heated with stirring to 252° C. under 30 psi (207 kPa) nitrogen. The |

-continued

| Material | Description |
|---|---|
| | reaction is held for 60 minutes while water evolution is observed. The kettle pressure is then reduced to atmospheric pressure. The kettle temperature is then increased to 274° C. while reducing the kettle pressure to 1 mmHg (0.13 kPa) vacuum. The viscosity of the material increases over a 90 minute period, after which time a high molecular weight sulfonated polyester is obtained. 726.4 g of the sulfonated polyester is dissolved in 726.4 g of isopropanol and 2905.6 g of water at 88° C. for 90 minutes. The batch temperature is then increased to 94° C. to remove the isopropanol (and a portion of the water), providing a 20% solids aqueous dispersion. |
| PE2 | PE2 refers to a water-dispersed co-polyester resin (25 wt. % solids) with a number average molecular weight of 15,000 g/mol for the base resin and $T_g$ of 20° C. for the base resin, available from Toyobo Co Ltd. (Osaka, Japan) under the trade designation VYLONAL MD-1480. |
| PU | PU refers to a water-borne polyurethane dispersion (34 wt. % solids), available from DSM NeoResins, Inc. (Wilmington, MA) under the trade designation NEOREZ R960. |
| NS1 | NS1 refers to an aqueous 20 nm silica sol (42 wt. % solids), available from Nalco Chemical Company (Naperville, IL) under the trade designation NALCO 2327. |
| NS2 | NS2 refers to an aqueous 5 nm silica sol (16 wt. % solids), available from Nalco Chemical Company (Naperville, IL) under the trade designation NALCO 2326. |
| NS3 | NS3 refers to an aqueous 90 nm silica sol (45 wt. % solids), available from Nalco Chemical Company (Naperville, IL) under the trade designation NALCO TX10693. |
| NS4 | NS4 refers to an aqueous 45 nm silica sol (41 wt. % solids), available from Nalco Chemical Company (Naperville, IL) under the trade designation NALCO DVSZN004. |
| FS | FS refers to a hydrophilic fumed silica powder, available from Evonik Industries (Piscataway, NJ) under the trade designation AEROSIL 200, further dispersed in water at 5 wt. % solids. |
| FCA | FCA refers to a foam control agent containing a blend of mineral oil, silica derivatives, and surface active compounds, available from Brentag Specialties, Inc. (Dublin, OH) under the trade designation DREWPLUS L198. |
| XL | XL refers to a polyfunctional aziridine liquid cross-linker, available from DSM NeoResins, Inc. (Wilmington, MA) under the trade designation CX-100. |
| DPGME | DPGME refers to di(propylene glycol) methyl ether, available from TCI America (Portland, OR). |

Formulations

Aqueous coating formulations were made according to the formulations listed in Tables 1-16, below. Calculated percent solids in the final coating are also provided in the tables.

The coating formulations were prepared generally as follows. For silica-containing formulations (i.e., those containing nanosilicas NS1-NS4 or fumed silica FS), DPGME was added to the commercially obtained aqueous suspension of colloidal silica with stirring, followed by the addition of aqueous polymeric components (polyesters (i.e., PE1 or PE2), polyurethanes (i.e., PU), and acrylates (i.e., AC1 or AC2), with gentle shaking/stirring (~30 seconds) between the addition of each polymeric component. Polyester components (if present) were added first, followed by polyurethane components (if present), and then acrylate components (if present). Foam control agent (i.e., FCA) and cross-linker (i.e., XL), if present, were added last, in that order. In all cases, the final formulations were mixed with a conventional propeller mixer for 2 minutes at moderate speed. Coating formulations not including silica were prepared similarly, but with the polymeric components added to DPGME (followed by foam control agent and crosslinker, if present).

TABLE 1

Coating formulation for A1 (Example 1, EX-1)

| Material | Amount (wt. %) | Percent Solids of Coating Formulation (wt. %) | Percent Solids in Coating (wt. %) |
|---|---|---|---|
| PE1 | 50.5 | 10.09 | 34.65 |
| PU | 15.3 | 5.20 | 17.86 |
| NS1 | 29.8 | 12.33 | 42.34 |
| DPGME | 3.0 | 0.00 | 0.00 |
| FCA | 0.04 | 0.04 | 0.14 |
| XL | 1.46 | 1.46 | 5.01 |
| Total | 100 | 29.12 | 100 |

TABLE 2

Coating formulation for A2 (Comparative Example 1, CE-1)

| Material | Amount (wt. %) | Percent Solids of Coating Formulation (wt. %) | Percent Solids in Coating (wt. %) |
|---|---|---|---|
| PE1 | 73.7 | 14.73 | 62.52 |
| PU | 22.3 | 7.59 | 32.22 |
| DPGME | 2.8 | 0.00 | 0.00 |

TABLE 2-continued

Coating formulation for A2 (Comparative Example 1, CE-1)

| Material | Amount (wt. %) | Percent Solids of Coating Formulation (wt. %) | Percent Solids in Coating (wt. %) |
|---|---|---|---|
| FCA | 0.06 | 0.06 | 0.25 |
| XL | 1.18 | 1.18 | 5.01 |
| Total | 100 | 23.56 | 100 |

TABLE 3

Coating formulation for B1 (Comparative Example 2, CE-2)

| Material | Amount (wt. %) | Percent Solids of Coating Formulation (wt. %) | Percent Solids in Coating (wt. %) |
|---|---|---|---|
| AC2 | 21.1 | 6.74 | 18.69 |
| PU | 39.6 | 13.47 | 37.34 |
| NS1 | 33.6 | 14.01 | 38.84 |
| DPGME | 3.9 | 0.00 | 0.00 |
| FCA | 0.05 | 0.05 | 0.14 |
| XL | 1.80 | 1.80 | 4.99 |
| Total | 100 | 36.07 | 100 |

TABLE 4

Coating formulation for B2 (Comparative Example 3, CE-3)

| Material | Amount (wt. %) | Percent Solids of Coating Formulation (wt. %) | Percent Solids in Coating (wt. %) |
|---|---|---|---|
| AC2 | 33.5 | 10.73 | 31.62 |
| PU | 63.0 | 21.44 | 63.19 |
| DPGME | 3.4 | 0.00 | 0.00 |
| FCA | 0.07 | 0.07 | 0.21 |
| XL | 1.69 | 1.69 | 4.98 |
| Total | 100 | 33.93 | 100 |

TABLE 5

Coating formulation for C1 (Example 2, EX-2)

| Material | Amount (wt. %) | Percent Solids of Coating Formulation (wt. %) | Percent Solids in Coating (wt. %) |
|---|---|---|---|
| AC1 | 46.0 | 9.21 | 36.35 |
| PE1 | 23.0 | 4.60 | 18.15 |
| NS1 | 27.7 | 11.53 | 45.50 |
| DPGME | 3.3 | 0.00 | 0.00 |
| Total | 100 | 25.34 | 100 |

TABLE 6

Coating formulation for C2 (Example 3, EX-3)

| Material | Amount (wt. %) | Percent Solids of Coating Formulation (wt. %) | Percent Solids in Coating (wt. %) |
|---|---|---|---|
| AC1 | 45.3 | 9.05 | 34.75 |
| PE1 | 22.6 | 4.53 | 17.40 |
| NS1 | 28.1 | 11.73 | 45.05 |
| DPGME | 3.2 | 0.00 | 0.00 |
| FCA | 0.04 | 0.04 | 0.15 |
| XL | 0.69 | 0.69 | 2.65 |
| Total | 100 | 26.04 | 100 |

TABLE 7

Coating formulation for D1 (Example 4, EX-4)

| Material | Amount (wt. %) | Percent Solids of Coating Formulation (wt. %) | Percent Solids in Coating (wt. %) |
|---|---|---|---|
| AC1 | 11.9 | 2.38 | 7.74 |
| PE2 | 38.2 | 9.55 | 31.05 |
| PU | 13.9 | 4.74 | 15.41 |
| NS1 | 33.7 | 14.04 | 45.64 |
| DPGME | 2.2 | 0.00 | 0.00 |
| FCA | 0.05 | 0.05 | 0.16 |
| Total | 100 | 30.76 | 100 |

TABLE 8

Coating formulation for D2 (Example 5, EX-5)

| Material | Amount (wt. %) | Percent Solids of Coating Formulation (wt. %) | Percent Solids in Coating (wt. %) |
|---|---|---|---|
| AC1 | 11.81 | 2.36 | 7.53 |
| PE2 | 37.90 | 9.48 | 30.26 |
| PU | 13.80 | 4.69 | 14.97 |
| NS1 | 33.46 | 14.05 | 44.85 |
| DPGME | 2.27 | 0.00 | 0.00 |
| FCA | 0.04 | 0.04 | 0.13 |
| XL | 0.71 | 0.71 | 2.27 |
| Total | 100 | 31.33 | 100 |

TABLE 9

Coating formulation for D3 (Comparative Example 4, CE-4)

| Material | Amount (wt. %) | Percent Solids of Coating Formulation (wt. %) | Percent Solids in Coating (wt. %) |
|---|---|---|---|
| AC1 | 17.8 | 3.56 | 13.81 |
| PE2 | 57.2 | 14.29 | 55.43 |
| PU | 20.8 | 7.09 | 27.50 |
| DPGME | 3.4 | 0.00 | 0.00 |
| FCA | 0.07 | 0.07 | 0.27 |
| XL | 0.77 | 0.77 | 2.99 |
| Total | 100 | 25.78 | 100 |

TABLE 10

Coating formulation for E (Example 6, EX-6)

| Material | Amount (wt. %) | Percent Solids of Coating Formulation (wt. %) | Percent Solids in Coating (wt. %) |
|---|---|---|---|
| AC1 | 11.1 | 2.21 | 7.64 |
| PE1 | 41.6 | 8.33 | 28.81 |
| PU | 13.0 | 4.41 | 15.25 |
| NS1 | 31.3 | 13.06 | 45.17 |
| DPGME | 2.1 | 0.00 | 0.00 |
| FCA | 0.05 | 0.05 | 0.17 |
| XL | 0.85 | 0.85 | 2.94 |
| Total | 100 | 28.91 | 100 |

TABLE 11

Coating formulation for F (Comparative Example 5, CE-5)

| Material | Amount (wt. %) | Percent Solids of Coating Formulation (wt. %) | Percent Solids in Coating (wt. %) |
|---|---|---|---|
| AC1 | 64.7 | 12.94 | 66.67 |
| PE1 | 32.3 | 6.47 | 33.33 |
| DPGME | 3.0 | 0.00 | 0.00 |
| Total | 100 | 19.41 | 100 |

TABLE 12

Coating formulation for G (Example 7, EX-7)

| Material | Amount (wt. %) | Percent Solids of Coating Formulation (wt. %) | Percent Solids in Coating (wt. %) |
|---|---|---|---|
| AC1 | 61.1 | 12.22 | 59.78 |
| PE1 | 30.6 | 6.11 | 29.89 |
| NS1 | 5.0 | 2.11 | 10.32 |
| DPGME | 3.3 | 0.00 | 0.00 |
| Total | 100 | 20.44 | 100 |

TABLE 13

Coating formulation for H (Example 8, EX-8)

| Material | Amount (wt. %) | Percent Solids of Coating Formulation (wt. %) | Percent Solids in Coating (wt. %) |
|---|---|---|---|
| AC1 | 47.5 | 9.50 | 36.55 |
| PE1 | 23.7 | 4.75 | 18.28 |
| NS3 | 25.7 | 11.74 | 45.17 |
| DPGME | 3.1 | 0.00 | 0.00 |
| Total | 100 | 25.99 | 100 |

TABLE 14

Coating formulation for I (Example 9, EX-9)

| Material | Amount (wt. %) | Percent Solids of Coating Formulation (wt. %) | Percent Solids in Coating (wt. %) |
|---|---|---|---|
| AC1 | 46.3 | 9.26 | 36.49 |
| PE1 | 23.1 | 4.63 | 18.24 |
| NS4 | 27.6 | 11.49 | 45.27 |
| DPGME | 3.0 | 0.00 | 0.00 |
| Total | 100 | 25.38 | 100 |

TABLE 15

Coating formulation for J (Example 10, EX-10)

| Material | Amount (wt. %) | Percent Solids of Coating Formulation (wt. %) | Percent Solids in Coating (wt. %) |
|---|---|---|---|
| AC1 | 32.1 | 6.42 | 36.88 |
| PE1 | 16.0 | 3.21 | 18.44 |
| NS2 | 48.6 | 7.78 | 44.69 |
| DPGME | 3.3 | 0.00 | 0.00 |
| Total | 100 | 17.41 | 100 |

TABLE 16

Coating formulation for K (Comparative Example 6, CE-6)

| Material | Amount (wt. %) | Percent Solids of Coating Formulation (wt. %) | Percent Solids in Coating (wt. %) |
|---|---|---|---|
| AC1 | 46.6 | 9.31 | 60.57 |
| PE1 | 23.3 | 4.66 | 30.32 |
| FS | 27.9 | 1.40 | 9.11 |
| DPGME | 2.2 | 0.00 | 0.00 |
| Total | 100 | 15.37 | 100 |

Meyer Bar Coating

Coating formulations described in Tables 1-16 were coated onto untreated 2 mil (0.051 mm) white polyester (PET) substrates (Mitsubishi Polyester Film, Greer, SC) using a #8 Meyer bar (available from RD Specialities, Inc., Webster, NY) to provide a dry coating thickness of approximately 0.07-0.17 mil (1.8-4.3 μm). The coated samples were heated to 200° F. for 30 sec to effect drying. Unless otherwise indicated, coated samples employing PET substrates were used for printing and testing.

Gloss Testing

The gloss of coated samples was measured using a micro-TM-gloss meter (a portable glossmeter available from BYK-Gardner USA, Columbia MD), which simultaneously measured gloss at 20, 60, and 85 degrees. Unless otherwise noted, three gloss measurements from three different locations from each coated sample were taken, and the gloss value results averaged. The averaged results are reported for the 60 degree measurement and are presented in Table 17, below.

TABLE 17

Gloss results for coated samples (PET substrates)

| Example | Coating Formulation | Gloss (60 degrees) |
|---|---|---|
| EX-1 | A1 | 76.1 |
| CE-1 | A2 | 81.3 |
| CE-2 | B1 | 82.1 |
| CE-3 | B2 | 87.5 |
| EX-2 | C1 | 81.7 |
| EX-3 | C2 | 68.9 |
| EX-4 | D1 | 72.1 |
| EX-5 | D2 | 62.9 |
| CE-4 | D3 | 82.7 |
| EX-6 | E | 72.6 |
| CE-5 | F | 89.5 |
| EX-7 | G | 88.9 |
| EX-8 | H | 88.7 |
| EX-9 | I | 82.5 |
| EX-10 | J | 87.0 |
| CE-6 | K | 38.1 |

The results in the above table show that the inventive coating formulations display high gloss, despite relatively high loadings of nanosilica. On the other hand, coating formulation K (CE-6), which included fumed silica, displayed low gloss.

Coating Anchorage Testing

Anchorage of the coatings to the PET substrate was evaluated in the following manner. Coated PET samples with dimensions of at least 3 inches×3 inches (7.6 cm×7.6 cm) were prepared. Samples were secured onto a flat, non-abrasive surface with a strong tack adhesive tape (available from 3M Company under the trade designation 3M Filament tape No. 893). The sample was scored using a cross hatch cutter with the blade spacing of 1 mm (available from BYK-Gardner USA, Columbia MD) diagonally from top left to bottom right and then top right to bottom left which created scored array of diamond patterns. Mild force was applied while scoring the sample. A strip of 1 inch×3 inches (2.5 cm×7.6 cm) filament tape was laminated over the scored sample. Moderate thumb pressure was applied to the laminated area. A fine point permanent marker was used to mark the outer borders of the laminated filament tape to designate between 2 one-square inch areas. The left square inch area was labeled "Slow Peel". The right square inch area was labeled "Fast Peel". The filament tape was peeled at approximately 12 in/min rate and at 180 degree peel angle for Slow Peel area. Once slow peeling approached the Fast Peel area, the filament tape was peeled at approximately 36 in/min rate and at 180 degree peel angle. Percent coating remaining was analyzed by observing loss of coating from the PET substrate, and percent (%) coating remaining was reported. Table 18 shows results of coating anchorage to PET substrate, for coatings derived from various coating formulations.

TABLE 18

Coating anchorage of coated samples (PET substrates)

| Example | Coating Formulation | Remaining Coating (%), Slow Peel | Remaining Coating (%), Fast Peel |
|---|---|---|---|
| EX-1 | A1 | 100 | 100 |
| CE-1 | A2 | 100 | 100 |
| CE-2 | B1 | 0 | 0 |
| CE-3 | B2 | 0 | 0 |
| EX-2 | C1 | 100 | 100 |
| EX-3 | C2 | 100 | 100 |
| EX-4 | D1 | 100 | 100 |
| EX-5 | D2 | 100 | 100 |
| CE-4 | D3 | 100 | 100 |
| EX-6 | E | 100 | 100 |
| CE-5 | F | 100 | 100 |
| EX-7 | G | 100 | 100 |
| EX-8 | H | 100 | 100 |
| EX-9 | I | 100 | 100 |
| EX-10 | J | 100 | 100 |
| CE-6 | K | 100 | 100 |

Ink Receptivity Testing

The ink receptivity of the coated samples (PET substrates) by flexographic and UV inkjet printing was evaluated as follows.

A. Flexographic Printing

Coated samples were cut to approximately 7 inches×12 inches (17.8 cm×30.5 cm). A hand ink proofer (available from Pamarco, Inc., Roselle, NJ) was cleaned thoroughly with water and dried. Coated samples were secured to a flat surface using filament tape, with the longer dimension running down-web. A disposable pipette was used to draw black ink (available from Siegwerk Environmental Inks, Morganton, NC), and was dispensed between the anilox and stainless steel cylinder of the hand ink proofer. To ensure good ink distribution, the ink-loaded hand ink proofer was rolled back and forth within a small distance at the top of the coated sample, where the printing was to begin. Ink was then applied with single draw, going from the top to the bottom of the coated sample. The ink-coated sample was inspected for uniformity and defects. The ink-coated sample was allowed to dry for a few minutes before further testing.

B. UV Inkjet Printing

Coated samples were cut to approximately 5 inches×10 inches (12.7 cm×25.4 cm) dimensions. Art work with different block colors (CMYK and green), along with multiple color barcodes (black and blue), 2-D barcodes (black, blue, red, and green), and some letters was selected to be printed on the UV inkjet printer. The coated samples were printed on a Prototype & Production Systems, Inc. DICElab process development printer using Fujifilm StarFire SG1024 print heads with PPSI DICEjet Gamma ink. They were printed at 400 dpi×400 dpi resolution on a slide table transport mechanism at 150 ft/min (0.762 m/s). The ink was cured using an Omnicure AC475-305 UV LED lamp.

Ink Anchorage Testing

Anchorage of the ink (either flexographically printed with the hand ink proofer or UV printed) to the coatings of the coated samples was evaluated in the same fashion as the Coating Anchorage Testing as previously described, but printed samples (from either flexographic or UV inkjet printing) were used rather than unprinted samples. Percent ink remaining was analyzed by observing loss of ink from the coating of the coated sample, and percent (%) ink remaining was reported.

Print Quality, Scratch Resistance, and Smear Resistance Evaluation

Print quality, scratch resistance, and smear resistance were evaluated for flexographic and UV inkjet printed coated samples. Flexographic printing was performed with an RK Flexiproof 100 (R K Print Coat Instruments Ltd., UK).

Print quality was assessed qualitatively on a 1 to 5 scale based on: resolution of the print, sharpness, and observable quality of fonts, numbers, and images. A print quality rating of 5 indicates a perfect (or nearly perfect) observable print with excellent resolution and image quality. In contrast, a print quality rating of 1 means poor observable print, which includes ink smearing and signs of streaking.

Scratch resistance was qualitatively assessed on a 1 to 5 scale by scratching the printed surface with the thumbnail and assessing the result. A scratch resistance rating of 5 indicates excellent resistance to thumb nail abrasion, whereas a rating of 1 indicates complete removal of ink upon thumb nail abrasion.

Smear resistance was qualitatively assessed on a 1 to 5 scale by smearing the printed surface with thumb pressure and assessing the result. A smear resistance rating 5 indicates that the sample showed excellent (e.g., complete) resistance to ink smearing, and rating 1 indicates a complete removal of ink upon smearing.

TABLE 19

Print anchorage, scratch resistance, and smear resistance for flexographically printed coated samples

| Example | Coating Formulation | Remaining Ink (%) on coated sample Slow Peel | Remaining Ink (%) on coated sample Fast Peel | Scratch Resistance Rating | Smear Resistance Rating |
|---|---|---|---|---|---|
| EX-1 | A1 | 100% | 99% | 4 | 5 |
| CE-1 | A2 | 95% | 50% | 3 | 4 |
| CE-2 | B1 | 1% | 1% | 3 | 5 |
| CE-3 | B2 | 0% | 0% | 1 | 5 |
| EX-2 | C1 | 100% | 100% | 5 | 5 |
| EX-3 | C2 | 100% | 100% | 3 | 4 |
| EX-4 | D1 | 100% | 100% | 4 | 5 |
| EX-5 | D2 | 100% | 100% | 4 | 5 |
| CE-4 | D3 | 100% | 99% | 3 | 5 |
| EX-6 | E | 99% | 99% | 4 | 5 |
| CE-5 | F | 100% | 100% | 3 | 4 |
| EX-7 | G | 100% | 100% | 5 | 5 |
| EX-8 | H | 100% | 100% | 5 | 5 |
| EX-9 | I | 100% | 100% | 5 | 5 |
| EX-10 | J | 100% | 99% | 3 | 5 |
| CE-6 | K | 100% | 100% | 4 | 5 |

TABLE 20

Print quality attributes for UV inkjet printed coated samples

| Example | Coating Formulation | Observable quality of red color block | Observable quality of black color block | Observable quality of fonts | Observable quality of barcode | Resolution |
|---|---|---|---|---|---|---|
| EX-1 | A1 | 4 | 5 | 5 | 5 | 5 |
| CE-1 | A2 | 4 | 5 | 5 | 5 | 5 |
| CE-2 | B1 | 4 | 5 | 5 | 5 | 4 |
| CE-3 | B2 | 4 | 5 | 5 | 4 | 4 |
| EX-2 | C1 | 3 | 4 | 5 | 4 | 4 |
| EX-3 | C2 | 2 | 3 | 5 | 4 | 4 |
| EX-4 | D1 | 4 | 5 | 5 | 5 | 5 |
| EX-5 | D2 | 4 | 5 | 5 | 5 | 5 |
| CE-4 | D3 | 3 | 4 | 4 | 4 | 4 |
| EX-6 | E | 3 | 4 | 5 | 4 | 4 |
| CE-5 | F | 2 | 3 | 4 | 4 | 4 |
| EX-7 | G | 3 | 3 | 4 | 4 | 4 |
| EX-8 | H | 3 | 4 | 4 | 4 | 4 |
| EX-9 | I | 4 | 5 | 4 | 4 | 4 |
| EX-10 | J | 4 | 5 | 4 | 4 | 4 |
| CE-6 | K | 3 | 4 | 4 | 4 | 4 |

TABLE 21

Print anchorage for UV inkjet printed block colors onto coated samples

| Example | Coating Formulation | Magenta | Green | Yellow | Cyan | Black |
|---|---|---|---|---|---|---|
| EX-1 | A1 | 30% | 99% | 95% | 97% | 90% |
| CE-1 | A2 | 60% | 99% | 95% | 98% | 90% |
| CE-2 | B1 | 5% | 5% | 25% | 75% | 5% |
| CE-3 | B2 | 1% | 90% | 33% | 75% | 5% |
| EX-2 | C1 | 100% | 100% | 100% | 100% | 100% |
| EX-3 | C2 | 100% | 100% | 100% | 100% | 100% |
| EX-4 | D1 | 95% | 100% | 95% | 100% | 90% |
| EX-5 | D2 | 99% | 100% | 100% | 100% | 95% |
| CE-4 | D3 | 97% | 100% | 100% | 99% | 95% |
| EX-6 | E | 100% | 100% | 100% | 100% | 99% |
| CE-5 | F | 100% | 100% | 100% | 100% | 100% |
| EX-7 | G | 100% | 100% | 100% | 100% | 100% |
| EX-8 | H | 100% | 100% | 100% | 100% | 100% |
| EX-9 | I | 100% | 100% | 100% | 100% | 100% |
| EX-10 | J | 97% | 99% | 100% | 100% | 90% |
| CE-6 | K | 100% | 100% | 100% | 100% | 100% |

TABLE 22

Print anchorage for UV inkjet printed bar codes onto coated samples

| Example | Coating Formulation | Black barcode | Blue barcode | Black 2 D code | Red 2 D code | Blue 2 D code | Green 2 D code |
|---|---|---|---|---|---|---|---|
| EX-1 | A1 | 95% | 98% | 95% | 95% | 96% | 96% |
| CE-1 | A2 | 75% | 90% | 50% | 75% | 95% | 95% |
| CE-2 | B1 | 33% | 40% | 25% | 25% | 60% | 50% |
| CE-3 | B2 | 25% | 25% | 5% | 25% | 50% | 75% |
| EX-2 | C1 | 95% | 100% | 99% | 100% | 100% | 100% |
| EX-3 | C2 | 100% | 100% | 100% | 100% | 100% | 100% |
| EX-4 | D1 | 99% | 100% | 95% | 95% | 99% | 99% |
| EX-5 | D2 | 100% | 100% | 97% | 99% | 100% | 100% |
| CE-4 | D3 | 99% | 100% | 95% | 98% | 100% | 100% |
| EX-6 | E | 95% | 99% | 95% | 99% | 99% | 100% |
| CE-5 | F | 100% | 100% | 100% | 100% | 100% | 100% |
| EX-7 | G | 100% | 100% | 100% | 100% | 100% | 100% |
| EX-8 | H | 100% | 100% | 100% | 100% | 100% | 100% |
| EX-9 | I | 99% | 100% | 100% | 100% | 100% | 100% |

TABLE 22-continued

Print anchorage for UV inkjet printed
bar codes onto coated samples

| Ex-ample | Coating Formulation | Remaining Ink (%) on coated sample | | | | | |
|---|---|---|---|---|---|---|---|
| | | Black barcode | Blue barcode | Black 2 D code | Red 2 D code | Blue 2 D code | Green 2 D code |
| EX-10 | J | 75% | 99% | 75% | 98% | 99% | 98% |
| CE-6 | K | 100% | 100% | 100% | 100% | 100% | 100% |

Substrate Variation

Additional print assessment tests were done for coating formulation D2 coated on to different film substrates—polypropylene (PP) (66 μm thickness) and polyvinyl chloride (PVC, 90 μm thickness). PP film was obtained from Jindal Films America LLC (LaGrange, GA) and used as received. PVC film was obtained from Mississippi Polymers (Corinth, MI) and pretreated using SSA EXTENDER/OVERPRINT* 440# chemical (Flint Group Narrow Web, Anniston, AL) prior to coating. Coating formulations were coated onto PP film and PVC film substrates using Meyer Bar Coating in the same manner as previously described for PET substrates. Flexographic and UV inkjet printing onto the PP and PVC coated substrates were evaluated in the same fashion as previously described for PET coated substrates. The results are shown in Tables 23-26.

TABLE 23

Print anchorage, scratch resistance, and smear resistance
for flexographically printed coated samples (PET, PP,
and PVC substrates), employing coating formulation D2

| Substrate film | Ink Anchorage (% Ink Remaining on Sample) | | Scratch Resistance Rating | Smear Resistance Rating |
|---|---|---|---|---|
| | Slow Peel | Fast Peel | | |
| PET | 100% | 100% | 4 | 5 |
| PP | 95% | 98% | 5 | 5 |
| PVC | 99% | 99% | 5 | 5 |

TABLE 24

Print quality attributes for UV inkjet printed coated samples
(PET, PP, and PVC substrates), employing coating formulation D2

| Substrate film | Observable quality of red color block | Observable quality of black color block | Observable quality of fonts | Observable quality of barcode | Resolution |
|---|---|---|---|---|---|
| PET | 4 | 5 | 5 | 5 | 5 |
| PP | 2 | 4 | 4 | 4 | 4 |
| PVC | 3 | 4 | 4 | 4 | 4 |

TABLE 25

Print anchorage for UV inkjet printed block colors
onto coated samples (PET, PP, and PVC substrates),
employing coating formulation D2

| Substrate film | Average Ink Anchorage (% Ink Remaining) | | | | |
|---|---|---|---|---|---|
| | Magenta | Green | Yellow | Cyan | Black |
| PET | 99% | 100% | 100% | 100% | 95% |
| PP | 100% | 100% | 100% | 100% | 100% |
| PVC | 100% | 100% | 100% | 100% | 100% |

TABLE 26

Print anchorage attributes for UV inkjet printing of barcodes Print
anchorage for UV inkjet printed bar codes onto coated samples
(PET, PP and PVC substrates), employing coating formulation D2

| Substrate film | Average Ink Anchorage (% Ink Remaining) | | | | | |
|---|---|---|---|---|---|---|
| | Black barcode | Blue barcode | Black 2 D code | Red 2 D code | Blue 2 D code | Green 2 D code |
| PET | 100% | 100% | 97% | 99% | 100% | 100% |
| PP | 100% | 100% | 100% | 100% | 100% | 100% |
| PVC | 100% | 100% | 100% | 100% | 100% | 100% |

Atomic Force Microscopy

AFM measurements of coated samples (PET substrates) prepared according to the present disclosure were obtained using a Bruker Dimension ICON AFM system equipped with a Nanoscope V Controller and Nanoscope 8.15 software. Tapping Mode AFM probes used were OTESPA R3 ($f_0$=300 kHz, k=26 N/m, tip radius (nom)=7 nm) and SSS-FM ($f_0$=75 kHz, k=2.8 N/m, tip radius (nom)=2-3 nm). The tapping setpoint is typically 85-90% of the free air amplitude. All AFM imaging was performed under ambient conditions. 3 μm×3 μm images were obtained at 512×512 data points, while larger scans were typically obtained at 1024×1024 data points. SPIP 6.5.1 software was used for image processing and analysis. Prior to calculating roughness parameters (Rq and Ra), images were applied with a first order planefit (to remove sample tilt) and when necessary, applied with 0th order flatten (to remove z-offsets or horizontal skip artifacts).

Image Rq is the root mean square average of height deviations taken from the mean image data plane, expressed as:

$$\text{Image } Rq = \sqrt{\frac{\sum Z_i^2}{N}}$$

where N is the total number of points and Z is the height at each point (relative to the mean height).

Image Ra is the arithmetic average of the absolute values of the surface height deviations measured from the mean plane, expressed as:

$$\text{Image } Ra = \frac{1}{N}\sum_{j=1}^{N}|Z_j|$$

where N is the total number of points and Z is the height at each point (relative to the mean height).

The surface roughness of selected coated samples was analyzed by atomic force microscopy (AFM) and are presented in Table 27, below.

TABLE 27

AFM-determined Ra & Rq values for selected coated samples

| Example | Topcoat Designations | Ra (nm) | Rq (nm) |
|---|---|---|---|
| CE-4 | D3 | 18.6 | 15.1 |
| CE-5 | F | 33.3 | 25.8 |
| EX-7 | G | 16.3 | 12.8 |
| EX-8 | H | 18.8 | 14.5 |
| EX-9 | I | 27.1 | 21.4 |
| EX-10 | J | 12.7 | 9.4 |
| CE-6 | K | 40.3 | 32.6 |

Scanning Electron Microscopy

FIGS. 1-4 are images of coated samples (PET substrates) prepared according to the present disclosure, obtained using scanning electron microscopy (SEM) following conventional procedures. A HITACHI 8230 field emission scanning electron microscope (FESEM) was used to obtain electron micrograph images of cross-sections. The imaging conditions used were: 3 kV, 5 mm WD, SEI detector, 0 degree tilt. Coated samples were first cut into houses and sputter coated with Au/Pd at 30 mA for 30 seconds before embedding in an epoxy resin, 3M SCOTCHCAST Electrical Resin 5 (3M Company, St. Paul, MN). The embedded samples were cryo-faced for FESEM cross-section examination, mounted unto Hitachi cross section stub, and sputter coated with Au/Pd at 20 mA for 25 seconds before imaging. Cross-section images were collected at 30,000× magnification. In each of FIGS. 1-4, the epoxy embedding resin is visible in a band across the top margin of the image, and the layer immediately below is the ink-receptive layer.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A coatable composition for formation of an ink-receptive layer, the coatable composition comprising a mixture of:
   a) 8.0 weight percent to 75 weight percent, based on the total weight of a), b), c), and d), of silica particles consisting of colloidal silica particles having an average particle size of 2.0 nanometers (nm) to 150 nm;
   b) 10 weight percent to 75 weight percent, based on the total weight of a), b), c), and d), of one or more polyester polymers;
   c) 10 weight percent to 75 weight percent, based on the total weight of a), b), c), and d), of one or more water-dispersible polymers selected from the group consisting of polyurethane polymers and (meth)acrylate polymers, wherein the one or more water-dispersible polymers are not water-soluble; and
   d) 0 weight percent to 10 weight percent, based on the total weight of a), b), c), and d), of one or more crosslinkers.

2. The coatable composition according to claim 1 which is an aqueous suspension.

3. The coatable composition according to claim 1 wherein the colloidal silica particles are present in an amount of at least 32.0 weight percent and not more than 57.0 weight percent, based on the total weight of a), b), c), and d).

4. The coatable composition according to claim 1 wherein the colloidal silica particles have an average particle size of at least 4.0 nm and not more than 95.0 nm.

5. The coatable composition according to claim 1 wherein the one or more crosslinkers are present in an amount of at least 0.5 weight percent, based on the total weight of a), b), c), and d).

6. The coatable composition according to claim 1 wherein the one or more polyester polymers include sulfonated polyester polymers.

7. An ink-receptive layer comprising a mixture of:
   a) 8.0 weight percent to 75 weight percent, based on the total weight of a), b), and c), of silica particles consisting of colloidal silica particles having an average particle size of 2.0 nanometers (nm) to 150 nm;
   b) 10 weight percent to 75 weight percent, based on the total weight of a), b), and c), of one or more polyester polymers; and
   c) 10 weight percent to 75 weight percent, based on the total weight of a), b), and c), of one or more water-dispersible polymers selected from the group consisting of polyurethane polymers and (meth)acrylate polymers, wherein the one or more water-dispersible polymers are not water-soluble.

8. The ink-receptive layer according to claim 7 wherein the colloidal silica particles are present in an amount of at least 32.0 weight percent and not more than 57.0 weight percent, based on the total weight of a), b), and c).

9. The ink-receptive layer according to claim 7 wherein the colloidal silica particles have an average particle size of at least 4.0 nm and not more than 95.0 nm.

10. The ink-receptive layer according to claim 7 wherein the one or more polyester polymers include sulfonated polyester polymers.

11. The ink-receptive layer according to claim 7 having a 60 degree gloss of at least 50.

12. The ink-receptive layer according to claim 7 which includes pores having a diameter of 0.05 micrometers or greater, and wherein the pores are present in a density such that a cross-section of the ink-receptive layer intersects 1 or more of such pores per 4.0 square micrometers.

13. The ink-receptive layer according to claim 7 wherein the one or more water-dispersible polymers are selected from the group consisting of polyurethane polymers.

14. The ink-receptive layer according to claim 7 wherein the ink-receptive layer is crosslinked.

15. The ink-receptive layer according to claim 7 wherein the ink-receptive layer is crosslinked with a polyfunctional aziridine.

16. The ink-receptive layer according to claim 7 wherein the polyurethane polymers comprise not more than 40 weight percent of monomer units derived from monomers other than polyisocyanate or polyol monomers.

17. The ink-receptive layer according to claim 7 wherein the colloidal silica particles have an average particle size of at least 4.0 nm and not more than 95.0 nm, wherein the one or more polyester polymers are water-dispersible sulfonated polyester polymers or polyester-polyether copolyesters, and wherein the polyurethane polymers have an aliphatic backbone and comprise not more than 40 weight percent of monomer units derived from monomers other than polyisocyanate or polyol monomers.

18. A construction comprising the ink-receptive layer according to claim 7 bound to a substrate layer comprising a material selected from the group consisting of polyester, polyethylene terephthalate, polypropylene, vinyl and polyvinyl chloride.

19. An ink-receptive layer comprising a mixture of:
I) 8.0 weight percent to 75 weight percent, based on the total weight of I) and II), of silica particles consisting of colloidal silica particles having an average particle size of 2.0 nanometers (nm) to 150 nm; and
II) crosslinked polymer obtained by reacting to form crosslinks a mixture of:
b) 20 weight percent to 80 weight percent, based on the total weight of b), c), and d), of one or more polyester polymers;
c) 20 weight percent to 80 weight percent, based on the total weight of b), c), and d), of one or more water-dispersible polymers selected from the group consisting of polyurethane polymers and (meth)acrylate polymers, wherein the one or more water-dispersible polymers are not water-soluble; and
d) 0.1 weight percent to 12 weight percent, based on the total weight of b), c), and d), of one or more crosslinkers.

20. The ink-receptive layer according to claim 19 wherein the colloidal silica particles are present in an amount of at least 32.0 weight percent and not more than 57.0 weight percent, based on the total weight of I) and II).

* * * * *